United States Patent [19]

Takagi et al.

[11] Patent Number: 5,539,519
[45] Date of Patent: Jul. 23, 1996

[54] COMPACT, HIGH RESOLUTION OPTICAL DISPLACEMENT DETECTOR

[75] Inventors: Masaaki Takagi; Takumi Fukuda, both of Tokyo, Japan

[73] Assignee: Copal Company Limited, Tokyo, Japan

[21] Appl. No.: 928,047

[22] Filed: Aug. 11, 1992

[30] Foreign Application Priority Data

Aug. 14, 1991 [JP] Japan ................................. 3-228816

[51] Int. Cl.⁶ ................................................ G01B 9/02
[52] U.S. Cl. ............................ 356/356; 250/237 G
[58] Field of Search ................................ 556/356, 373; 250/237 G, 231.16, 231.14

[56] References Cited

U.S. PATENT DOCUMENTS

| | | | |
|---|---|---|---|
| 4,112,295 | 9/1978 | Dubik et al. | 250/237 G |
| 4,518,859 | 5/1985 | Hoshika | 250/231 |
| 4,912,322 | 3/1990 | Ichikawa | 356/373 |
| 4,939,380 | 7/1990 | Berger et al. | 250/237 G |
| 4,956,553 | 9/1990 | Matsui | 250/237 G |
| 4,998,013 | 3/1991 | Epstein et al. | 250/237 G |
| 5,155,355 | 10/1992 | Kabaya | 250/237 G |

OTHER PUBLICATIONS

Oriel Signal Catalog—"Optics and Filters"—vol. III, p. 65, 1984.

*Primary Examiner*—Samuel A. Turner
*Attorney, Agent, or Firm*—Sixbey, Friedman, Leedom & Ferguson

[57] ABSTRACT

The optical displacement detecting device utilizes an encoder plate 2 mounted displaceably along a given first plane and having thereon a periodic slit pattern 1. A light source 4 is disposed behind the encoder plate 2 to illuminate the slit pattern 1 to form a primary fringe image 3 shifting along the first plane. A lens member 6 is utilized to project the primary fringe image 3 by a given magnification to form a secondary enlarged fringe image 5 shifting along a given second plane. A light receiving unit 8 is fixed in the secondary plane to optically detect the shifting secondary enlarged fringe image 5 through a periodic mask pattern to thereby output an electric signal 7 indicative of a displacement of the encoder plate 2.

8 Claims, 10 Drawing Sheets

COMPACT, HIGH RESOLUTION OPTICAL DISPLACEMENT DETECTOR

BACKGROUND OF THE INVENTION

The present invention relates to an optical displacement detector or an optical encoder utilizing an encoder plate which is mounted to undergo an angular or linear displacement to modulate an incident light so that its displacement is detected based on variation in a modulated light intensity.

The conventional optical encoder utilizes either of a geometrical optics system and a wave optics system. The known optical encoder of the wave optics type utilizes an interference or a diffraction of coherent light, and comprises a coherent light source such as a semiconductor laser, an encoder plate formed with a diffraction grating and a photosensor. The diffraction grating has a lattice constant comparable to a wavelength of the coherent light, hence the optical encoder of the wave optics type features high resolution and compact size. However, the semiconductor laser generally utilized as the coherent light source suffers from a temperature-dependent oscillating characteristic which would cause a detection error. In addition, the semiconductor laser suffers from a relatively short life time.

On the other hand, the known optical encoder of the geometrical optics type utilizes a linearity or directibility of the light, and comprises an incoherent light source such as a light emitting diode (LED), a pair of a movable slit plate and a stationary slit plate, and a photosensor. The combination of the movable and stationary slit plates is utilized to intermittently switch an incident light so as to detect a displacement based on a light intensity variation.

The encoder of the geometrical optics system generally utilizes an incoherent light source composed of the light emitting diode LED, which has a life time longer than that of the semiconductor laser used as a coherent light source in the wave optics system. Further, the temperature dependency does not matter since the LED is utilized as an incoherent light source. However, in order to improve resolution in the encoder of the geometrical optics system, a pitch of slits formed on the movable and stationary slit plates must be reduced, thereby causing degradation of the directibility of the light transmitting through the slits due to optical diffraction. In addition, the LED is not an ideal point light source, but has actually a certain light emitting area to thereby cause divergence of the light transmitting through the slits. The moving slit plate and the stationary slit plate must be faced with each other as close as possible in order to prevent the degradation of light beam directibility and to prevent the light divergence. However, the moving slit plate constitutes an encoder plate which normally undergoes an irregular surface level fluctuation during the course of a regular movement. Such a surface level fluctuation is accelerated by mechanical vibration or shock imposed externally. Therefore, the gap between the moving slit plate and the stationary slit plate must be set in taking account of a certain allowance for the surface level fluctuation. Thus, it is practically difficult to suppress the degradation of the light beam directibility, thereby hindering fine resolution and scale-down of the geometrical optics type encoder.

SUMMARY OF THE INVENTION

In view of the above noted drawbacks of the conventional geometrical optics type encoder, an object of the present invention is to provide an improved geometrical optics type encoder featuring high resolution while keeping a sufficient gap between a moving slit plate and a stationary slit plate. According to the invention, the optical displacement detecting device is comprised of a displacement member having a periodic slit pattern and being mounted displaceably along a first plane. A light source is disposed for illuminating the slit pattern to form a primary fringe image shifting along the first plane. A lens member is povided for projecting the primary fringe image by a given magnification to form a secondary enlarged fringe image shifting along a second plane. A light receiving unit is fixed in the second plane for receiving the shifting secondary enlarged fringe image through a periodic mask pattern so as to produce an electric signal indicative of a displacement of the displacement member.

DETAILED DESCRIPTION OF THE INVENTION

Figure 1:
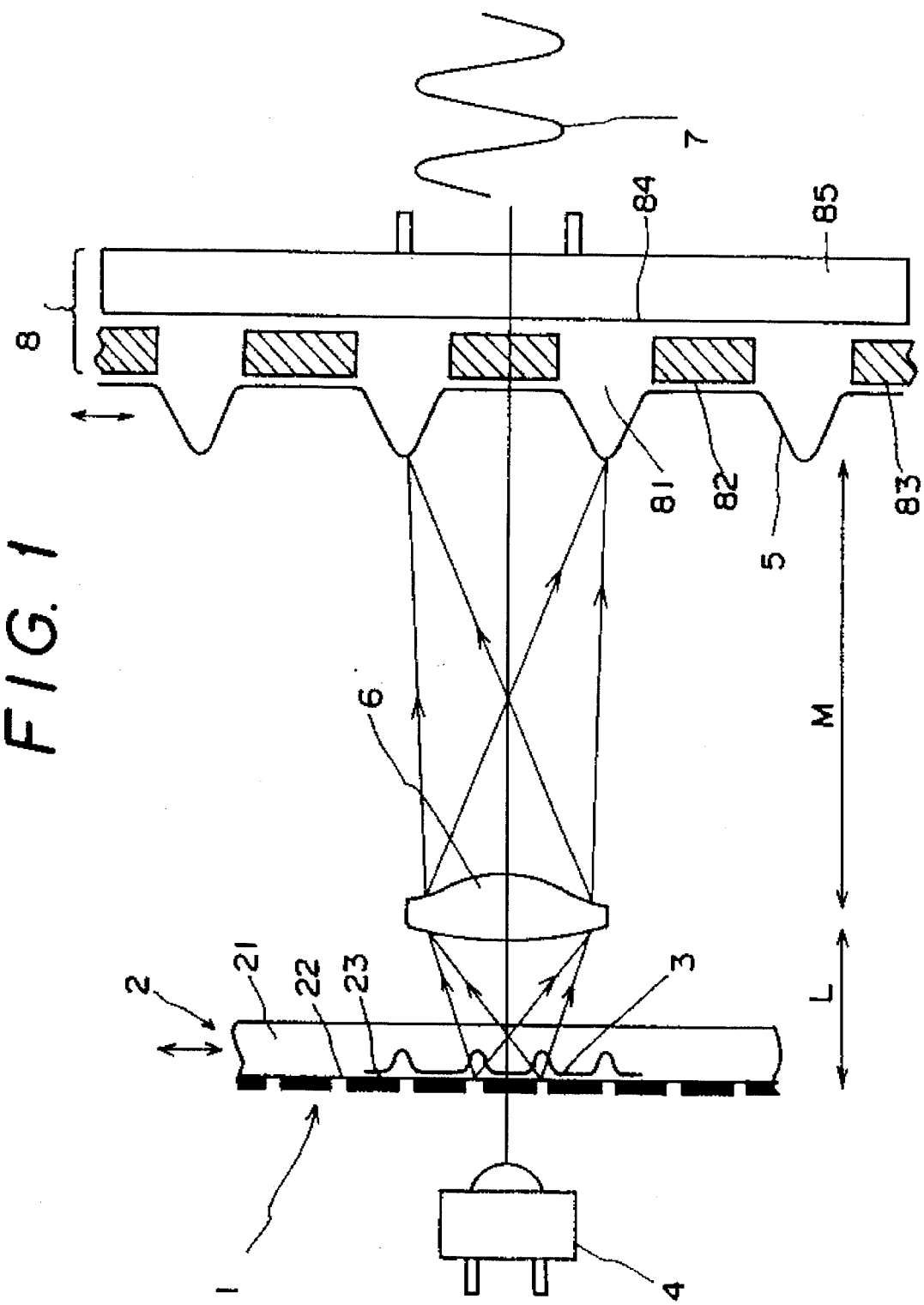
FIG. 1 is a schematic diagram showing basic construction of the inventive optical displacement detecting device.

Referring to FIG. 1, the description is given for the basic concept of the invention. The disclosed optical displacement detecting device is comprised of a displacement member 2, a light source 4, a lens member 6, and a light receiving unit 8. The displacement member 2 is provided with a periodic slit pattern 1, and is mounted to undergo a displacement along a given first plane. The light source 4 illuminates the slit pattern 1 to form a primary fringe image 3 shifting along the first plane. The lens member 6 projects the primary fringe image by a given magnification to form an enlarged secondary fringe image 5 shifting along a second plane. The light receiving unit 8 is fixed in the second plane to receive the moving secondary fringe image 5 through a periodic mask pattern to output an electric signal 7 indicative of displacement of the encoder member 2.

Preferably, the displacement member 2 is comprised of a transparent substrate 21 having the slit pattern 1 composed of a periodic and alternate arrangement of a transparent section 22 and an opaque section 23. The light source 4 is disposed to illuminate the transparent substrate 21 from back side to form the primary fringe image 3. Further, the light receiving unit 8 has a double layer structure composed of a fixed mask plate 83 and a photosensing element 85. The fixed mask plate 83 has a periodic arrangement of an open section 81 and a block section 82 formed according to the periodic mask pattern. The photosensing element 85 has a uniform light receiving area 84 disposed behind the fixed mask plate 83. However, the light receiving unit 8 is not limited to such a double layer structure. For example, the light receiving unit 8 may have a single layer structure composed of a photosensing element having a periodic photosensitive region formed according to the periodic mask pattern. In such a case, a pair of periodic photosensitive regions of comb-shape are interlaced with each other to produce a pair of complementary electric signals. Moreover, the lens member 6 may be comprised of an aspherical lens effective to eliminate aberration from the secondary fringe image 5.

In operation, the light source 4 composed of, for example, LED illuminates the slit pattern 1 to form the primary fringe image 3 shifting along the first plane. This first plane is set a distance L in an optical axis direction from the lens member 6. The primary fringe image 3 has a peak pitch corresponding to the period of the slit pattern 1. This primary fringe image 3 is projected expandingly to focus the enlarged secondary fringe image 5 on the second plane. The second plane is set a distance M from the lens member 6 the optical axis direction. These distances L and M are determined according to the lens formula $(1/M)+(1/L)=1/F$ where F denotes a focal length of the lens member 6. As understood from this lens formula, the magnification is given M/L for the secondary fringe image 5 relative to the primary fringe image 3.

As indicated by the arrows in the figure, the secondary fringe image 5 shifts accordingly when the primary fringe image 3 shifts, while shifting directions are opposite to each other. Peaks of the shifting secondary fringe image 5 are received intermittently through the fixed mask plate 83 by the photosensing element 85 to output the AC electric signal 7 according to periodic variation in received light intensity. The AC electric signal 7 has a frequency representative of a velocity of the displacement member 2, and a number of wave peaks represents an incremental displacement amount.

According to such a construction, there can be obtained an encoder featuring a high resolution utilizing a directibility or linearity of light beam while the light receiving unit 8 can be spaced sufficiently from the displacement member 2. The slit pattern on the first plane side can be made fine for higher resolution, while it is not necessary to make fine the mask pattern on the second plane side. The above noted magnification is applied to the relation between periods of the slit pattern and the mask pattern.

Figure 2:
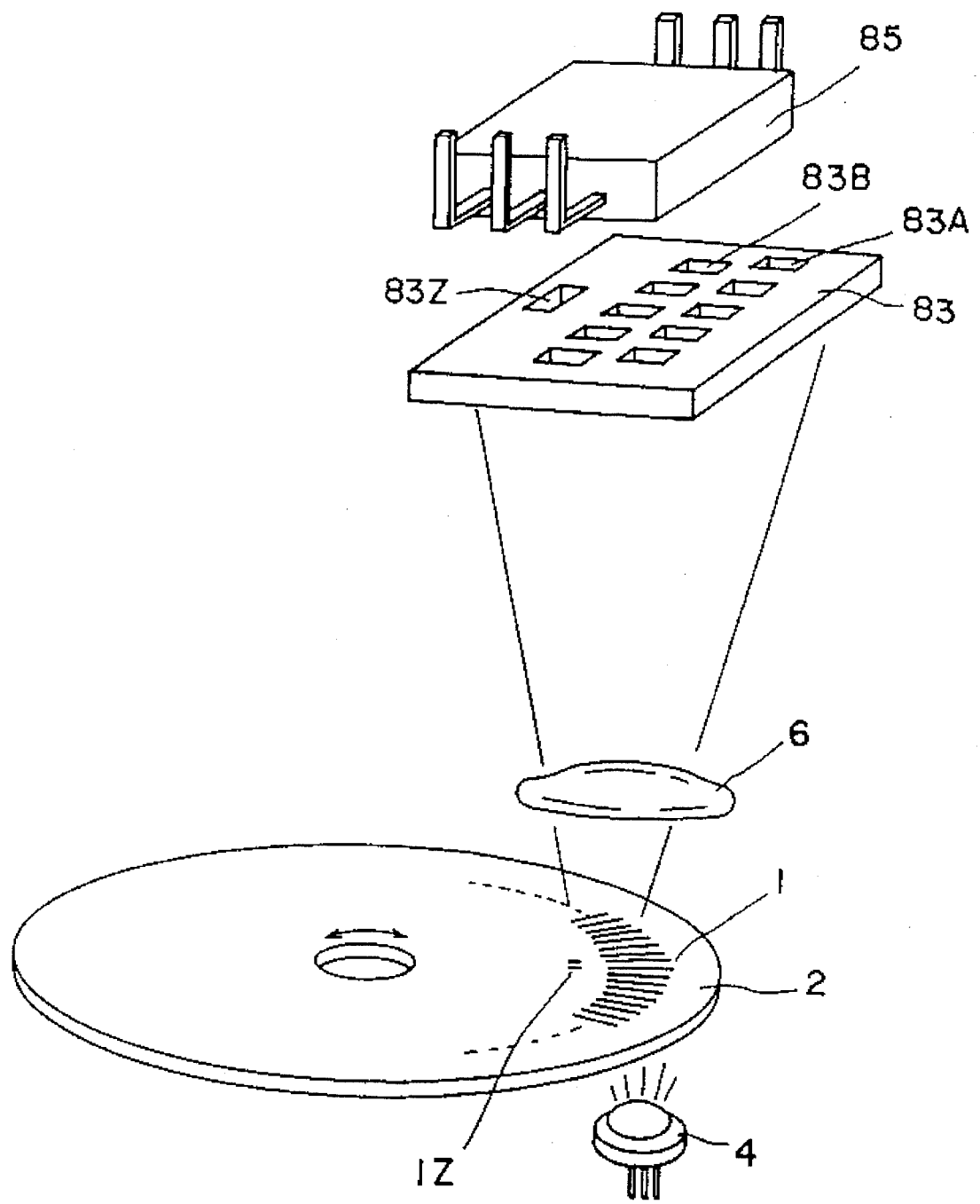
FIG. 2 is a schematic exploded perspective view showing one embodiment of the inventive optical displacement detecting device in the form of a rotary encoder.

Hereinafter, detailed description will be given for preferred embodiments of the invention. FIG. 2 is a schematic exploded perspective view of one embodiment of the inventive optical displacement detecting device in the form of an incremental rotary encoder. The present invention can be applied not only to a rotary encoder, but also to a linear encoder. The disclosed rotary encoder utilizes, as an illuminating light source, an LED 4 featuring a long life duration and a low price. A rotary encoder plate 2 is disposed rotatably in front of the LED 4. The encoder plate 2 is composed of a transparent substrate such as a glass plate formed on its bottom face with a slit pattern 1. The slit pattern 1 is arranged at a given period or pitch circumferentially of the rotary encoder plate 2. A pair of index slits 1Z are formed radially inward of the periodic or incremental slit pattern 1. The pair of index slits 1Z are spaced from each other an interval identical to one pitch of the incremental slit pattern 1, so as to indicate a reference position of the encoder plate 2. The slit pattern 1 and index slits 1Z are formed in very fine manner by photolithography and etching.

An enlargement focusing lens member is disposed forward of the encoder plate 2. This member is comprised of an aspherical lens 6 effective to substantially eliminate an aberration from an enlarged image of the slit pattern 1. Namely, an aspherical factor is suitably set to form a clear and sharp enlarged image. A stationary mask plate 83 is fixed in a forward focal plane of the lens 6. The fixed mask plate 83 is formed with a first slit lattice 83A, a second slit lattice 83B and a window 83Z. Each slit lattice has a spatial period corresponding to a dark/bright band pitch of the enlarged fringe image. The first slit lattice 83A and the second slit lattice 83B have a phase difference of 90 degree with each other in order to detect a rotation direction of the encoder disc plate 2. Further, the single window 83Z is positioned to selectively admit an enlarged image of the index slits 1Z. A photosensing element 85 is composed of a photodiode having a uniform photosensitive area, and is positioned behind the fixed mask plate 83.

Figure 3:
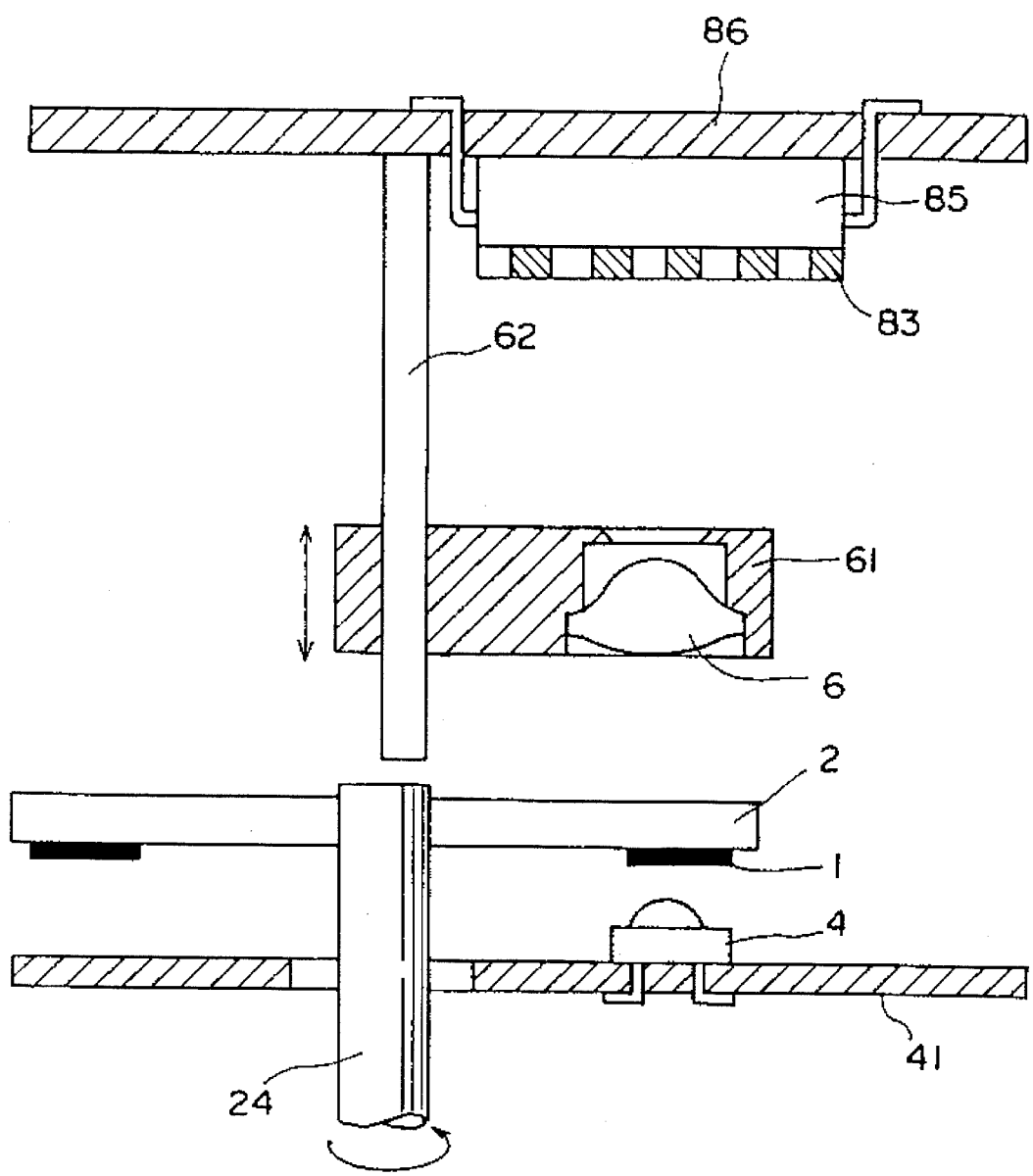
FIG. 3 is a schematic partially sectional view of the FIG. 2 rotary encoder.

FIG. 3 is a schematic partially sectional side view of the FIG. 2 rotary encoder. The LED 4 of the illuminating light source is mounted on a lower circuit board 41. On the other hand, the photosensing element 85 is mounted on an upper circuit board 86. In this embodiment, the stationary mask plate 83 is fixed on the surface of the photosensing element 85. The aspherical lens 6 is interposed between the spaced circuit boards 41 and 86. This lens 6 is supported through a holder 61 by a vertical rod 62, one end of which is fixed to the upper circuit board 86. The lens holder 61 is supported slideably up and down along the vertical rod 62, in order to adjust a position of the lens 6 in the optical axis direction to correct an assembling error and a dimensional error of the encoder structure so as to form a clear and sharp secondary image. The rotary encoder plate 2 is interposed rotationally between the lens 6 and the LED 4. The encoder plate 2 is formed on its bottom face with the slit pattern 1. The rotary encoder plate 2 is fixed to one end of a rotational shaft 24. The other end of the rotational shaft 24 is connected to an object (not shown) to be detected or monitored.

Figure 4:
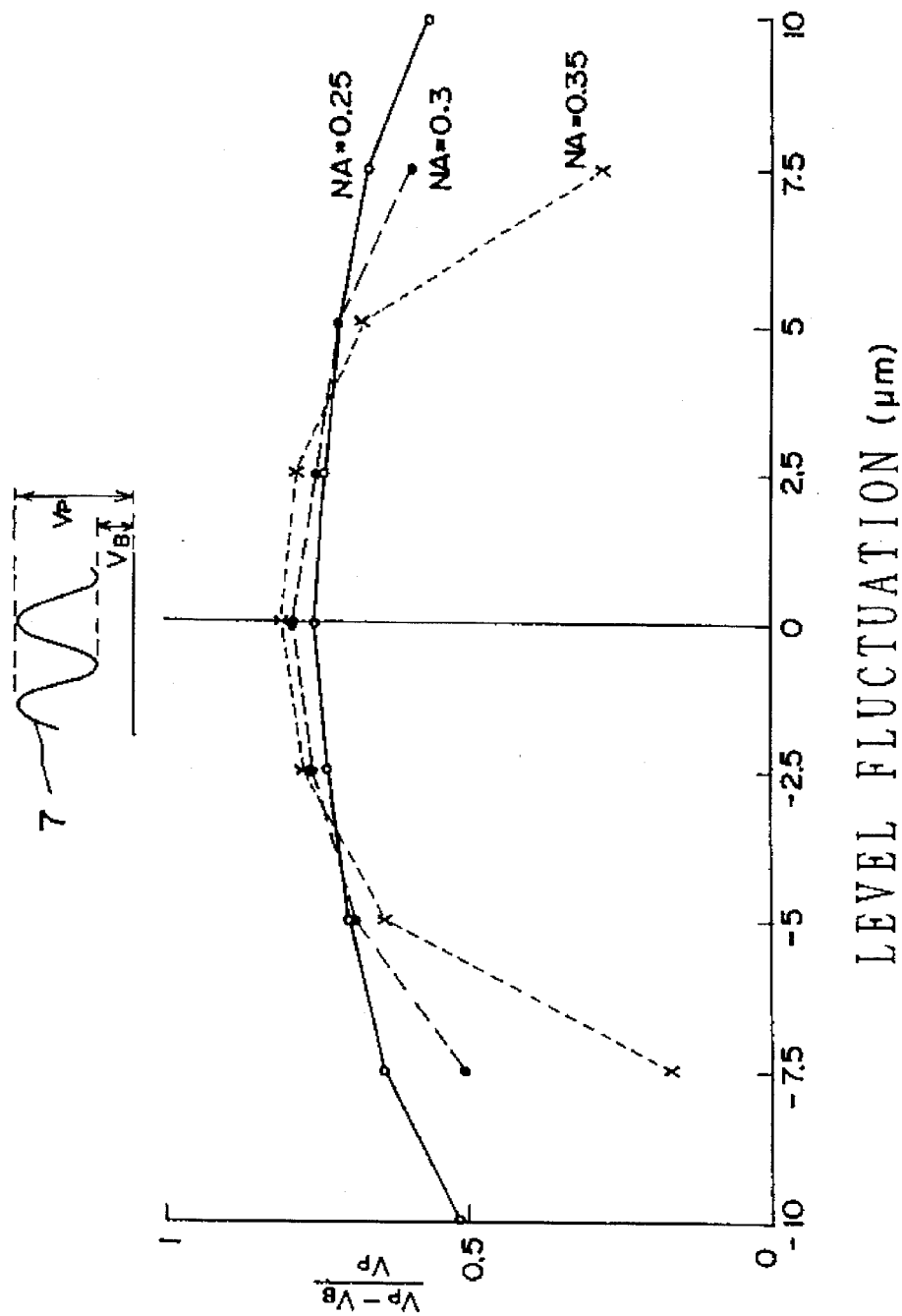
FIG. 4 is a graph showing the relation between a surface level fluctuation of an encoder plate and an encoder output.

FIG. 4 is a graph showing output characteristics of the encoder shown in FIGS. 2 and 3. As shown in the top part of the drawing, the photosensing element outputs an AC electric signal 7 in response to variation in the received light intensity of the moving secondary fringe image. This electric signal 7 contains a DC offset component VB and an AC signal component (VP-VB). In the FIG. 4 graph, the horizontal axis denotes a surface level fluctuation of the encoder disc plate, and the vertical axis denotes a normalized magnitude of the AC signal component. The numerical aperture NA of the magnifying focus lens 6 is set as a parameter variably to 0.25, 0.3 and 0.35. The greater the numerical aperture, the brighter the enlarged image to thereby reduce affect of optical diffraction so that the AC signal component becomes greater when the surface level fluctuation is zero, while the focal depth becomes shallow. In obtaining the measurement results of the FIG. 4 graph, a pitch of the slit pattern 1 is set to 5.5 μm, and a duty of the bright and dark bands thereof is set to 50%. Further, the aspherical lens has a focal length of 3.2 mm and a magnification of 15.

As seen from the graph, there is observed no significant degradation of the AC signal component without regard to the value of NA as long as the surface level fluctuation is limited within the absolute range of 5 μm, hence the inventive encoder can produce a stable detection output. Namely, the inventive encoder has a great allowance for the surface level fluctuation of the encoder disc plate, and therefore has a strong resistance against external vibration and shock. Particularly, in case of using the lens of NA=0.25 having a relatively deep focal depth, the variation in the AC signal component is suppressed even in the wider absolute range of 10 μm of the encoder disc level fluctuation. The magnitude of the AC signal component is not so degradated with using the projection lens having a relatively small NA though the brightness of the projected image is lowered.

Figure 5:
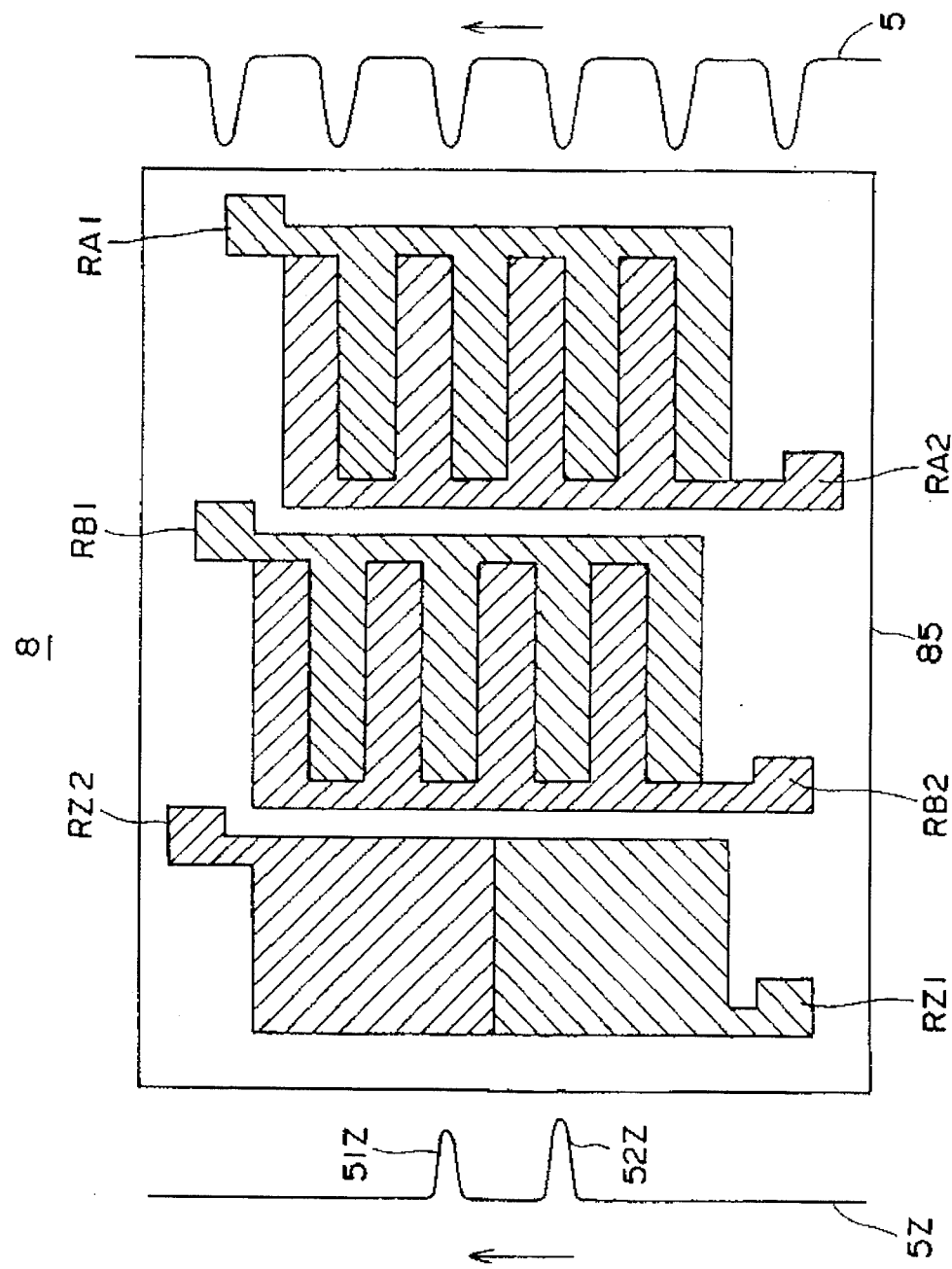
FIG. 5 is a plan view showing a pattern of a light receiving area used in another embodiment of the inventive rotary encoder.

Referring to FIG. 5, the description is given for another embodiment of the inventive optical displacement detecting device. The FIG. 5 embodiment shows a light receiving unit of the single layer structure in place of the double layer structure used in the FIGS. 2 and 3 embodiment. As shown in the figure, the light receiving unit 8 is composed solely of a photosensing element 85 having a light receiving area formed with effective photosensitive regions according to given periodic patterns. A pair of comb-shape effective photosensitive regions RA1 and RA2 are interlaced with one another, and are disposed on a rightward section of the light receiving area. The one comb-shape photosensitive region RA1 has a spatial period identical to that of peaks of the enlarged secondary fringe image 5 schematically illustrated right side of the photosensitive region RA1. The other comb-shape photosensitive region RA2 has the same spatial period, but is phase-shifted from the region RA1 by 180 degree. By such an arrangement, at one moment when the region RA1 receives bright bands of the enlarged fringe image 5, the other region RA2 receives dark bands of the enlarged fringe image 5. At another moment when the region RA1 receives the dark bands, the other region RA2 registers with the bright bands. In such a manner, the pair of comb-shape photosensitive regions RA1 and RA2 can output a pair of complementary detection signals having a relative phase shift of 180 degree with each other.

Another pair of comb-shaped photosensitive regions RB1 and RB2 are interlaced with each other, and are disposed on a central section of the light receiving area. These pair of comb-shape photosensitive regions RB1 and RB2 are phase-shifted by 90 degree from the before-mentioned pair of comb-shape photosensitive regions RA1 and RA2. Therefore, in case that the enlarged image 5 is shifted upward as indicated by the arrow in the figure, the pair of photosensitive regions RA1 and RA2 produce the detection signals which are advancing by phase of 90 degree relative to the detection signals produced by the other pair of photosensitive regions RB1 and RB2. On the other hand that the secondary fringe image 5 shifts downward, there is caused a relative phase delay of 90 degree.

Lastly, two-divided photosensitive regions RZ1 and RZ2 are formed on a left section of the light receiving area. These two-divided photosensitive regions are positioned to selectively receive an enlarged image 5Z of the pair of index slits 1Z shown in FIG. 2. The enlarged index image 5Z contains a pair of first peak 51Z and second peak 52Z corresponding to the pair of index slits 1Z. The pair of peaks have a time interval therebetween corresponding to a spatial peak interval of the enlarged image 5Z. As shown in FIG. 5, in case that the enlarged index image 5Z shifts upward, firstly the one divided region RZ1 receives the one peak 51Z, and then receives the other peak 52Z. Thereafter, the other divided region RZ2 receives the first peak 51Z and subsequently the second peak 52Z.

Figure 6:
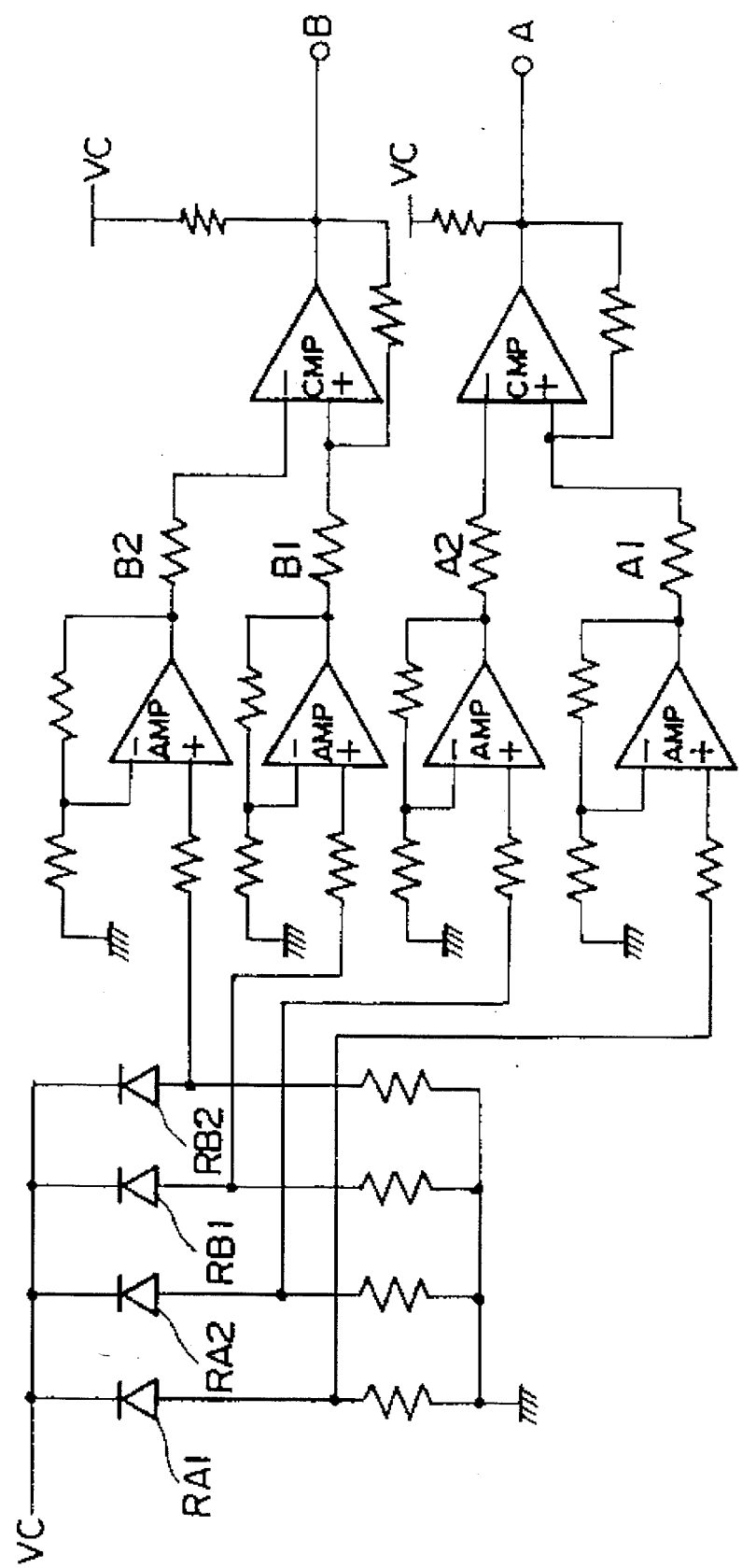
FIG. 6 is a circuit diagram showing a processing circuit for processing a detection signal fed from the light receiving unit of FIG. 5 to obtain an incremental signal.

Next referring to FIG. 6, the description is given for a processing circuit for processing the detection signals outputted from the four comb-shape photosensitive regions RA1, RA2, RB1 and RB2 to produce an incremental signal. A photocurrent generated by the comb-shape photosensitive region RA1 is amplified by a corresponding amplifier AMP to form a detection signal A1. In similar manner, another photocurrent generated by the photosensitive region RA2 is amplified to form another detection signal A2. Further, a detection signal B1 is obtained from the photosensitive region RB1, and a detection signal B2 is obtained from the photosensitive region RB2. The pair of detection signals A1 and A2 are compared with each other by a comparator CMP to produce an A-phase incremental signal A. In similar manner, the other pair of detection signals B1 and B2 are compared with each other by another corresponding comparator CMP to produce a B-phase incremental signal B.

Figure 7:
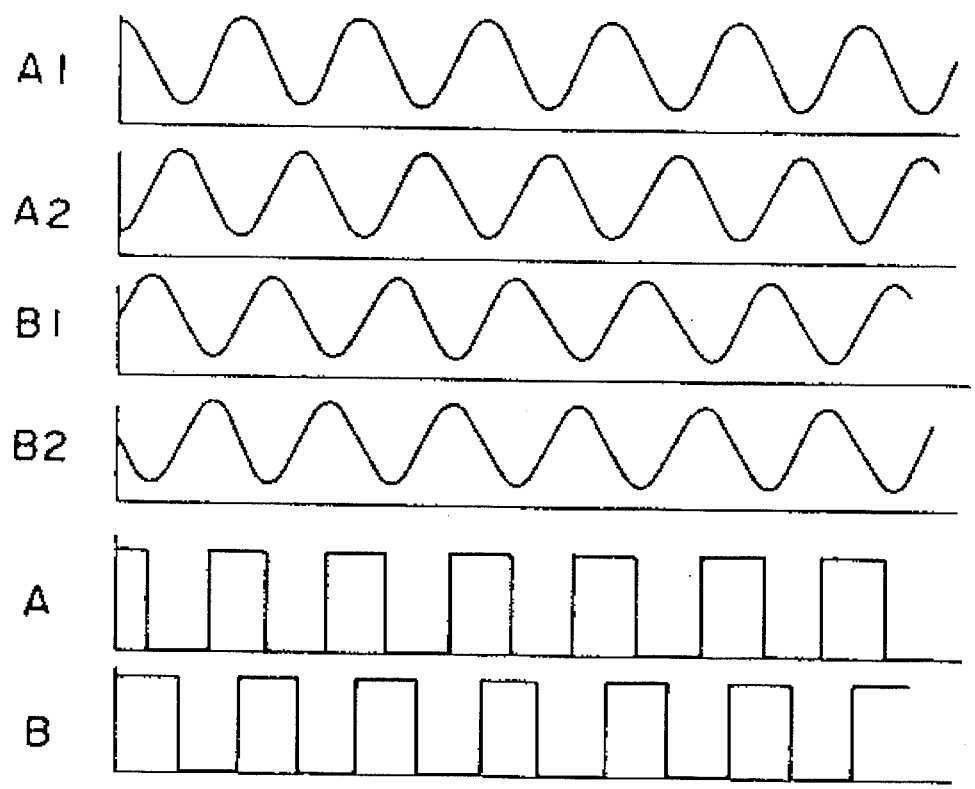
FIG. 7 is a waveform diagram showing the operation of the FIG. 6 incremental signal processing circuit.

FIG. 7 is a waveform diagram illustrative of the operation of the incremental signal processing circuit shown in FIG. 6. The detection signal A1 has a sinewave-like form according to intermittent receiving of peaks of the shifting enlarged fringe image. Similarly, the detection signal A2 has a sinewave-like form which is phase-shifted by 180 degree relative to the detection signal A1. These pair of detection signals A1 and A2 are processed with each other by the comparator to thereby produce the A-phase incremental signal A composed of a train of square pulses having a duty ratio of 50%. A number of pulses indicates an incremental displacement amount and a rate of pulses indicates a displacement velocity. In similar manner, the other pair of detection signals B1 and B2 have sinewave-like forms with a relative phase difference of 180 degree. Moreover, these sinewave-like forms of B1 and B2 have a relative advancing or delaying phase difference of 90 degree with respect to those of detection signals A1 and A2 according to the displacement direction. These detection signals B1 and B2 are processed with each other by the comparator to form the B-phase incremental signal B composed likewise of a pulse train which is phase-shifted by +90 degree or -90 degree relative to the A-phase incremental signal A. The polarity of the phase difference is electrically detected to discriminate the displacement direction of the encoder plate.

Figure 8:
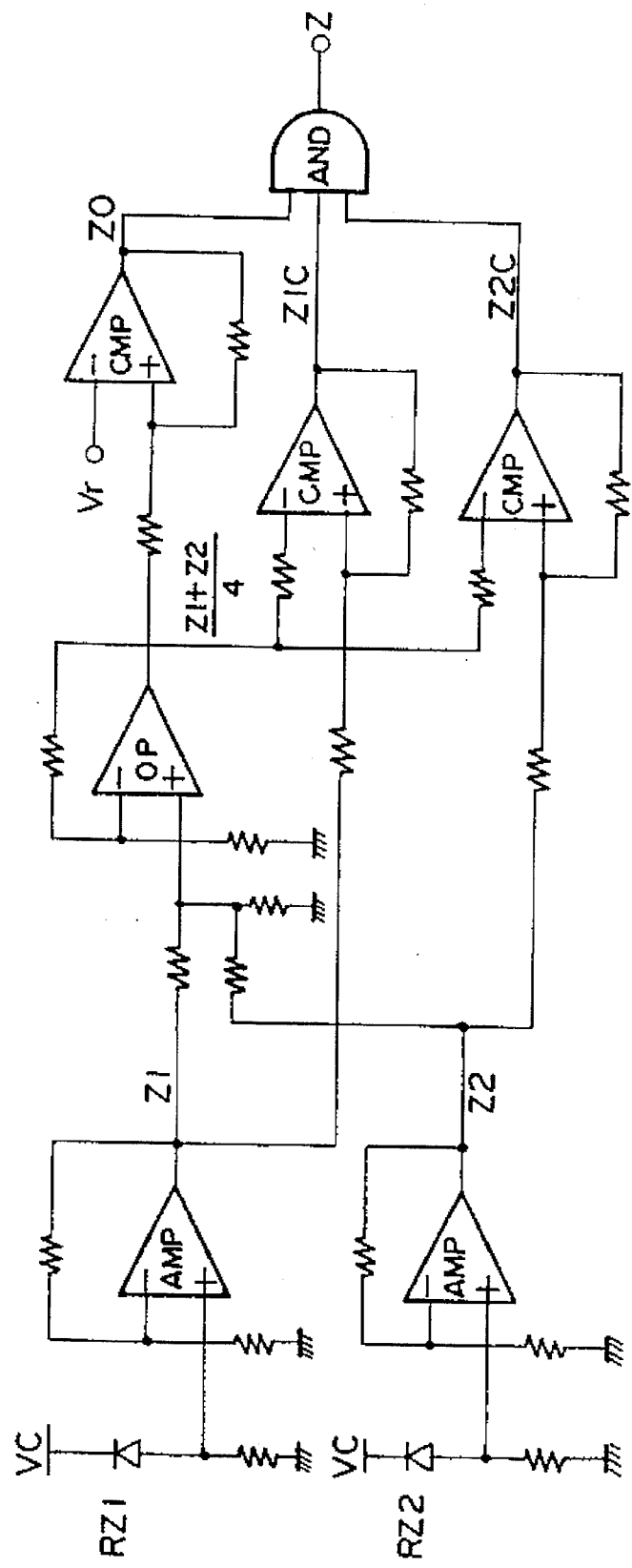
FIG. 8 is a circuit diagram showing another processing circuit for processing a detection signal fed from the light receiving unit of FIG. 5 to output an index signal.

Next, FIG. 8 shows a processing circuit for processing signal outputs from the two-divided photosensitive regions RZ1 and RZ2 shown in FIG. 5 to produce a Z-phase index signal Z indicative of a reference position of the encoder disc plate. As shown in the figure, a photocurrent outputted from the one divided photosensitive region RZ1 is processed by an amplifier AMP to produce an amplified detection signal Z1. In similar manner, another photocurrent outputted from the other divided photosensitive region RZ2 is processed by a corresponding amplifier AMP to produce another amplified detection signal Z2. These detection signals Z1 and Z2 are subjected to addition and division operation by an operator OP to produce a reference signal (Z1+Z2)/4. Further, the one detection signal Z1 and the reference signal are compared to each other by a comparator CMP to produce a falling signal Z1C. In similar manner, the other detection signal Z2 is compared to the reference signal by a corresponding comparator CMP to produce a rising signal Z2C. Further, the reference signal (Z1+Z2)/4 is compared to a given threshold voltage signal Vr to form a window signal ZO. This threshold voltage signal Vr is set to a given level identical to ¾ of the maximum level of the reference signal. Lastly, the falling signal Z1C, the rising signal Z2C and the window signal ZO are processed by an AND gate circuit AND to form the Z-phase index signal Z.

Figure 9:
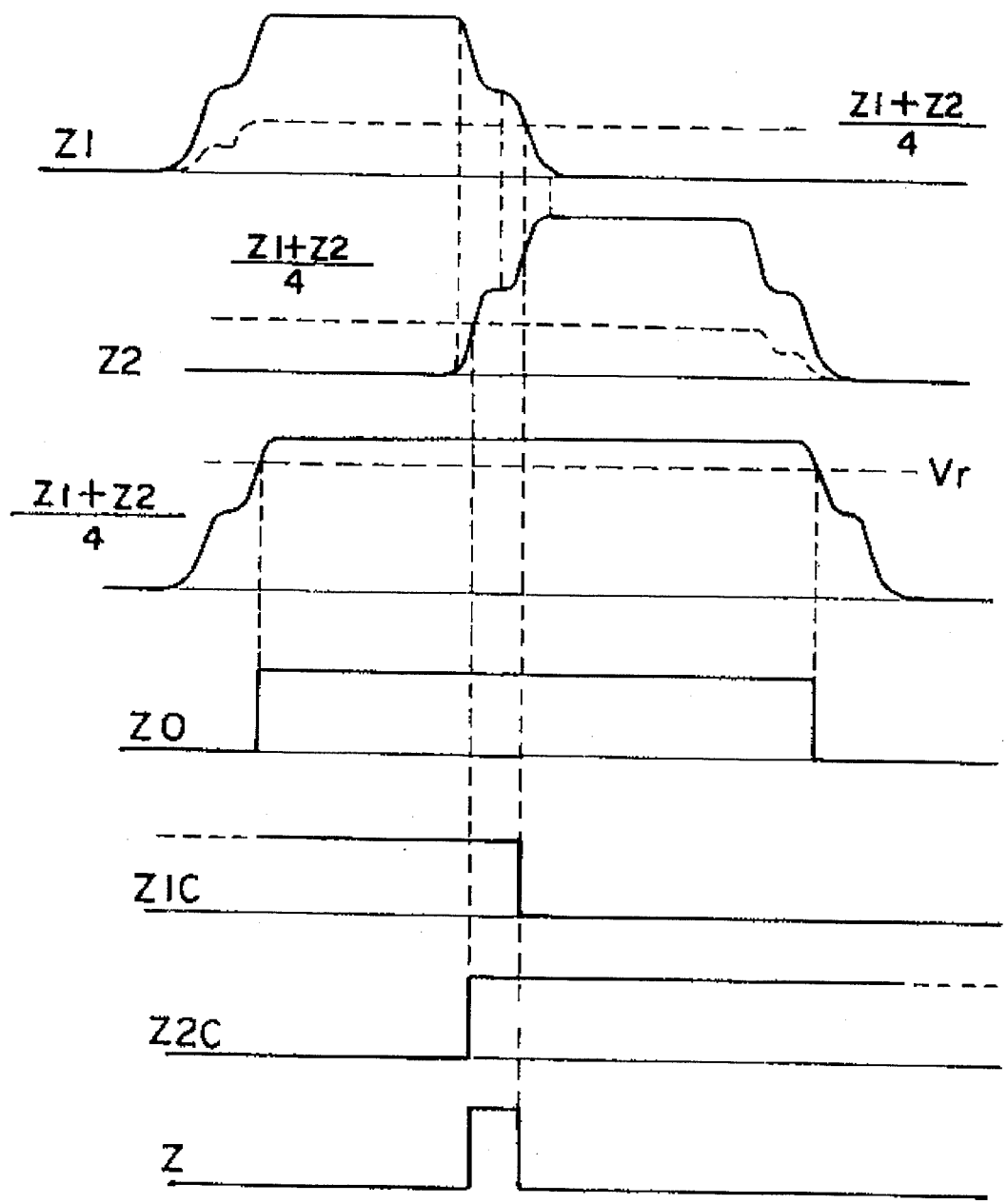
FIG. 9 is a waveform diagram showing the operation of the index signal processing circuit.

FIG. 9 is a waveform diagram illustrating the operation of the FIG. 8 index signal processing circuit. The one detection signal Z1 rises one step upon receipt of the first peak 51Z of the enlarged index image shown in FIG. 5, and subsequently rises one more step upon receipt of the second peak 52Z. Thereafter, the detection signal Z1 falls one step when the first peak 51Z passes away from the one divided photosensitive region RZ1, and then falls one more step to the zero level when the second peak 52Z passes away. In similar manner, the other deteciton signal Z2 has a two-step rising part and a two-step falling part. The rising part of the second detection signal Z2 coincides with the falling part of the first detection signal Z1. The reference signal (Z1+Z2)/4 is produced by adding the first and second detection signals Z1 and Z2, and the voltage level of the added result is reduced by ¼. This reference signal is processed by the threshold voltage signal Vr to produce the window signal ZO. Further, the detection signal Z1 is compared to the reference signal to form the falling signal Z1C. Moreover, the detection signal Z2 is compared to the same reference signal to form the rising signal Z2C. Finally these three signals ZO, Z1C and Z2C are subjected to the logical product process to thereby produce the Z-phase index signal Z representative of the reference position of the encoder plate. This Z-phase index signal is composed of a single shot pulse having a duration accurately coincidence with one period of the incremental signal.

Figure 10:
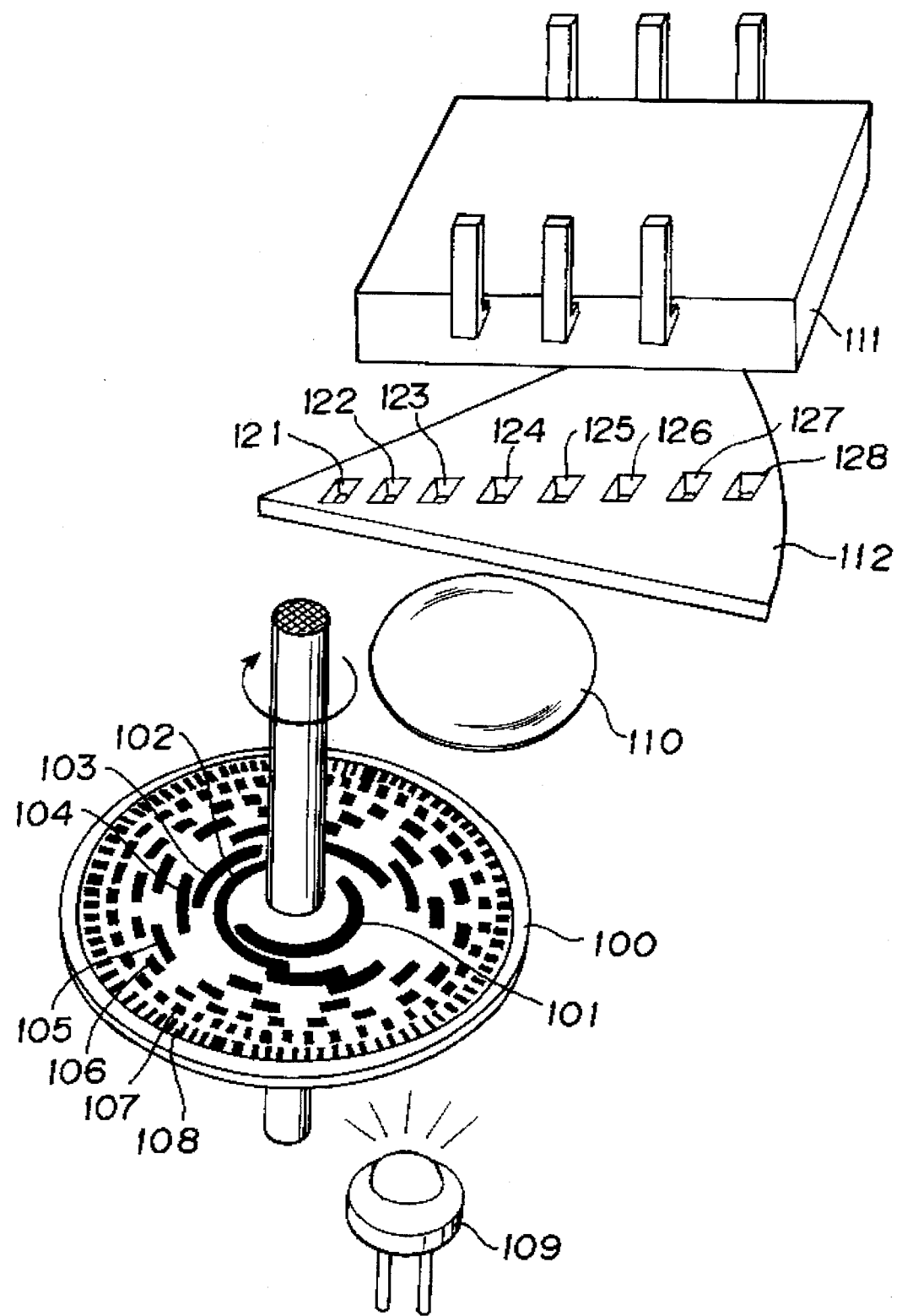
FIG. 10 is a schematic exploded perspective view showing another embodiment of the mention.

FIG. 10 shows another embodiment of the present invention. This optical rotary encoder is of the absolute type, whereas the FIG. 2 embodiment is of the incremental type. The incremental type operates to optically count a number of radial slits with respect to a given index point. On the other hand, the absolute type operates to optically detect a coded pattern formed on a rotary disc to read directly an absolute position. As shown in FIG. 10, the absolute type encoder utilizes a rotary disc 100 formed thereon with a plurality of tracks 101–108 arranged concentrically with each other. These tracks 101–108 define a slit pattern bit-coded to represent an absolute angular position of the disc. These tracks 101–108 correspond sequentially to higher order bit through lower order bit, respectively along the radially outward direction. A light source such as an LED 109 is disposed one side of the disc 100 to illuminate the tracks 101–108. A projecting lens 110 is disposed on the other side of the disc 100 in registration with the LED 109 to project the illuminated slit pattern of the tracks 101–108 by a given magnification rate. A photodetecting array 111 is disposed to receive the projected and enlarged pattern through a fixed mask plate 112 to thereby produce a detection signal each track. Namely, the mask plate 112 has a plurality of windows aligned radially a given pitch to separate the projected light each track. The produced detection signals are processed to decode the slit pattern to determine the absolute position or address of the rotary disc 100.

For illustrative purpose, eight number of the tracks 101–108 are formed on the disc so that the eight tracks can record 8-bit parallel data indicative of $2^8$ angular gradations of the disc. As readily understood, the more the number of tracks, the higher the resolution of the absolute angular position detection. Typically, the disc is formed with 12 number of concentrical tracks. In such case, the radial pitch of the track arrangement is made very small in order to avoid scale-up of the disc. Further, the outermost track corresponding to the lowest order bit has an extremely fine circumferential pitch of the slit pattern because the circumferential pitch is set $½^{12}$ as that of the innermost track corresponding to the highest order bit. In such type of the compact and high resolution absolute encoder, the present invention is most advantageous, because the very fine slit pattern is enlarged by use of the interposed projection lens so that the photodetector array can detect the projected light with good S/N ratio and with practical dimension of the light receiving area. Stated otherwise, according to the invention, very fine slit pattern can be formed on the disc to improve the resolution and to save an area of the disc, while the photodetector array may have a sufficient light receiving area to ensure the practical S/N ratio and to ensure light separation between adjacent tracks.

As described above, according to the present invention, the encoder plate formed with a slit pattern is illuminated by a light source to form a primary fringe image. This primary image is expandingly projected by a lens to form an enlarged secondary fring image. This enlarged fringe image is optically sensed through a mask pattern so as to detect displacement of the encoder plate. By such a construction, the slit pattern can be made fine as compared to the prior art to thereby advantageously improve resolution of the encoder output. Further, it is not necessary to face the mask pattern closely to the slit pattern in contrast to the prior art to thereby advantageously broaden an allowance of the encoder plate level fluctuation, as well as to improve mechanical resistance and stability of the encoder structure against externally imposed shock and vibration.

What is claimed is:

1. An optical displacement detecting device comprising: a displacement member having a periodic slit pattern and being mounted displaceably along a first plane; a light source disposed on one side of the first plane for illuminating the slit pattern to form a primary fringe image shifting along the first plane; a lens member disposed on another side of the first plane for projecting the primary fringe image by a given magnification to form a secondary enlarged fringe image shifting along a second plane; and a light receiving unit including a single layer structure composed of a photosensing element having a periodic mask pattern means formed from a pattern of periodic effective photosensitive regions on said element having a period the same as that of the secondary enlarged fringe image and being fixed in the second plane such that said photosensing element produces an electrical signal indicative of a displacement of the displacement member, said photosensitive regions on said element being comb-shaped and interlaced with one another for producing a pair of complementary electric signals.

2. An optical displacement detecting device according to claim 1; wherein the displacement member is composed of a transparent substrate having formed thereon with a slit pattern comprised of a periodic arrangement of a transparent segment and an opaque segment, and the light source illuminates a back of the transparent substrate to form thereon the primary fringe image.

3. An optical displacement detecting device according to claim 1, wherein the displacement member has a pair of additional slits spaced from each other in a displacement direction of the displacement member and being positioned at an origin point of the displacement member; and wherein the light receiving unit has a pair of additional photosensitive regions aligned in the displacement direction for receiving secondary enlarged slit images of the additional slits when the same traverses over the light source, and for outputting a pair of corresponding detection signals; and further comprising first means for adding the detection signals with each other and for reducing a magnitude of an added form of the detection signals by a given rate to produce a reference signal, second means for comparing each of the detection signals with the reference signal to form a stepwise rising signal and a stepwise falling signal, and third means for logically processing the stepwise rising signal and the stepwise falling signal with each other to produce an index signal indicative of the origin point of the displacement member.

4. An optical displacement detecting device according to claim 3, further including fourth means for truncating the reference signal by a given threshold level to form a window signal, and for filtering the index signal by the window signal.

5. An optical displacement detecting device according to claim 3, wherein the first means includes means for reducing the magnitude of the added form of the detection signals by the rate of ¼.

6. An optical displacement detecting device according to claim 3, wherein the first means includes means for reducing the magnitude of the added form of the detection signals by the rate of ¾.

7. An optical displacement detecting device according to claim 1; wherein the lens member comprises an aspherical lens effective to substantially eliminate aberration from the secondary enlarged fringe image.

8. An optical encoder comprising: a movable member including thereon a plurality of tracks, each track having a slit pattern bit-coded to indicate an absolute position of the movable member, and being mounted movably along a first plane; a light source disposed on one side of the first plane for illuminating the slit pattern to form a primary image shifting along the first plane; and lens member disposed on another side of the first plane for projecting the primary image by a given magnification to form a secondary image shifting along a second plane and having a plurality of light receiving areas corresponding to the respective tracks for receiving the shifting secondary image track by track so as to produce an electric signal indicative of the absolute position of the movable plate.

* * * * *